US008757352B1

(12) United States Patent
Daboub et al.

(10) Patent No.: US 8,757,352 B1
(45) Date of Patent: Jun. 24, 2014

(54) DOWNSTREAM DIVERTER

(75) Inventors: Brent A. Daboub, Fort Worth, TX (US); Federico Ayala, Grand Prairie, TX (US)

(73) Assignee: National Presort, Inc., Fort Worth, TX (US)

( * ) Notice: Subject to any disclaimer, the term of this patent is extended or adjusted under 35 U.S.C. 154(b) by 34 days.

(21) Appl. No.: 13/552,744

(22) Filed: Jul. 19, 2012

(51) Int. Cl.
*B65G 47/82* (2006.01)

(52) U.S. Cl.
USPC ... 198/367; 198/598; 198/457.07; 198/463.4; 198/370.05; 198/370.08

(58) Field of Classification Search
USPC ................ 198/598, 456, 457.07, 463.4, 367, 198/370.05, 370.08, 370.09; 209/657
See application file for complete search history.

(56) References Cited

U.S. PATENT DOCUMENTS

| | | | | |
|---|---|---|---|---|
| 1,729,671 | A * | 10/1929 | Bell-Irving et al. | 198/367 |
| 4,557,474 | A * | 12/1985 | Davis et al. | 271/301 |
| 4,633,997 | A * | 1/1987 | Woodman, Jr. | 198/456 |
| 4,913,295 | A * | 4/1990 | Murphy et al. | 209/583 |
| 6,550,603 | B1 * | 4/2003 | Beach et al. | 198/360 |
| 6,607,065 | B2 * | 8/2003 | Peppel | 198/367 |
| 6,721,388 | B2 * | 4/2004 | Tybinkowski et al. | 378/17 |
| 6,843,365 | B2 * | 1/2005 | Baker | 198/813 |
| 7,334,687 | B2 * | 2/2008 | Yurko | 209/652 |
| 7,954,622 | B2 * | 6/2011 | Schimmel et al. | 198/367.1 |

* cited by examiner

*Primary Examiner* — Leslie A Nicholson, III
(74) *Attorney, Agent, or Firm* — James E. Walton; Damon R. Hickman

(57) ABSTRACT

A downstream diverter for processing mail at high speeds, the diverter is positioned on a mail sorter machine, so that the force of the mail as it is sorted is isolated from the solenoid driving the diverter.

16 Claims, 11 Drawing Sheets

DOWNSTREAM DIVERTER

BACKGROUND

1. Field of the Invention

The present application relates to a Locking Cam Downstream Diverter Gate Assembly for diverting articles such as letter and flats mail, and/or parcels processed by an automatic sorting machine.

2. Description of Related Art

Machines for automatically sorting articles, such as mail, into one of an array of selected bins or compartments, are common. Typically, such sorting machines have a feeding mechanism that inducts articles one-at-a-time into belts and/or onto conveyors. Sensing components along the travel path monitor and track the movement of the articles. When necessary, control electronics command a diverting gate assembly or other redirecting mechanism to reroute the article into a specific destination compartment or bin.

Although sorting machines have over time improved processes for article sorting, a weak point of these sorting machines is the diverter gate assembly that directs the articles to the receiving compartments or bins.

Diverter gate assemblies are typically comprised of a vane, mounted on the shaft of a solenoid. When the Control Electronics energizes the solenoid, it pivots the vane to block the travel path thereby diverting the article to the desired compartment or bin.

Upstream Diverter Gate Assemblies feature a vane, mounted on the shaft of a solenoid, where the leading edge of the vane points toward the oncoming article stream. Suitable Control Electronics connected to the solenoid energize and de-energize the solenoid, causing and controlling the selective movement of the vane.

For correct operation, Upstream Diverter Gate Assemblies require very fast and accurate timing control. Even a minor timing error causes the leading edge of the vane to "spear" the oncoming mailpiece and therefore jam the sorting machine. In addition, this event may damage oncoming articles and may also damage the equipment.

The effort required to clear the resulting jams and replace damaged articles is time consuming and costly. In addition, the loss of production and the effort required to shutdown the sorter for repair is time consuming and costly.

Downstream Diverter Gate Assemblies do not have the timing issues associated with Upstream Diverter Gate Assemblies and are therefore a better solution.

Downstream Diverter Gate Assemblies feature a vane, mounted on the shaft of a solenoid, where the leading edge of the vane points away from the oncoming article stream. Suitable Control Electronics connected to the solenoid energize and de-energize the solenoid, causing and controlling the selective movement of the vane.

With the leading edge of the vane pointing away from the oncoming article stream, the "spearing" problem is eliminated. However, correct operation of a Downstream Diverter Gate Assemblies can be problematic since they can be overdriven when struck by larger articles or by articles traveling at the higher transport speeds possible in state-or-the-art sorting machines.

A Downstream Diverter Gate Assembly is overdriven when the force of the oncoming article exceeds the strength and ability of the Downstream Diverter Gate Assembly to efficiently and without delay divert the article.

When a Downstream Diverter Gate Assemblies fails to efficiently and without delay divert the article, the slowing of the article may cause a jam. The effort required to clear the resulting jams and replace damaged articles is time consuming and costly.

Alternately, when a Downstream Diverter Gate Assemblies fails to divert the article, the article is routed by default to a last bin in the sorter, which is often referred to as a mechanical reject or a purge bin. Additional processing on the sorter or manual handling is then required to get the articles to the correct compartment or bin.

Accordingly, there exists a need for Downstream Diverter Gate Assemblies for diverting articles that cannot be overdriven by articles traveling at the higher transport speeds required in state-or-the-art sorting machines.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
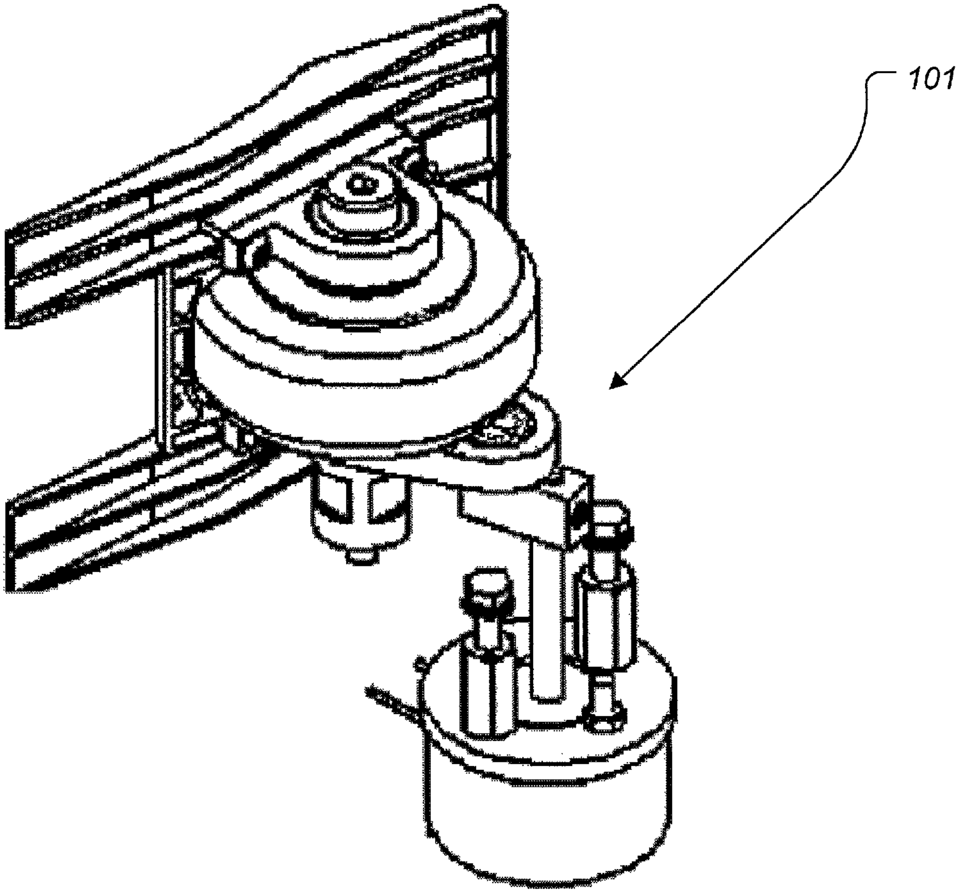
FIG. 1 is a perspective view of the preferred embodiment of a Locking Cam Diverter Gate Assembly for letter mail and like items according to the present application.

While the system and method of the present application is susceptible to various modifications and alternative forms, specific embodiments thereof have been shown by way of example in the drawing and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

The features and processes of the present application overcome disadvantages associated with both Upstream Diverter Gate Assembly and Downstream Diverter Gate Assembly designs and functions.

Illustrative embodiments are described below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

FIG. 1 illustrate a Locking Cam Downstream Diverter Gate Assembly 101 for diverting articles such as letter and flats mail, and/or parcels to a destination compartment or bin. The present device can be adapted for use on a variety of automatic sorting machines used for diverting and sorting substantially like articles such as letter and flats mail, and/or parcels.

Figure 2:
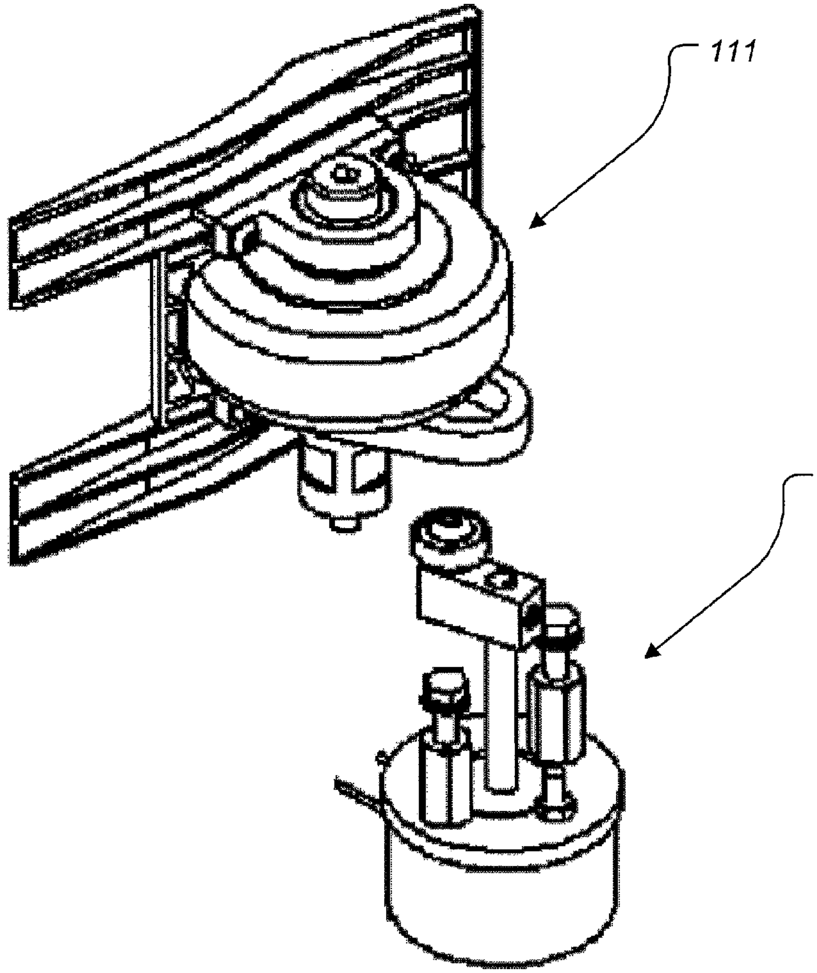
FIG. 2 is a perspective view of the preferred embodiment of a Diverter Gate with Locking Cam Subassembly and a Solenoid with Cam Bearing Subassembly for letter mail and like items according to the present application.

Referring now also to FIG. 2 in the drawings, the preferred embodiment of a Locking Cam Diverter Gate Assembly 101 according to the present application is illustrated. Each Locking Cam Diverter Gate Assembly 101 is uniquely implemented in two interlocking subassemblies; the Diverter Gate with Locking Cam Subassembly 111 and the Solenoid with Cam Bearing Subassembly 151.

Figure 3A:
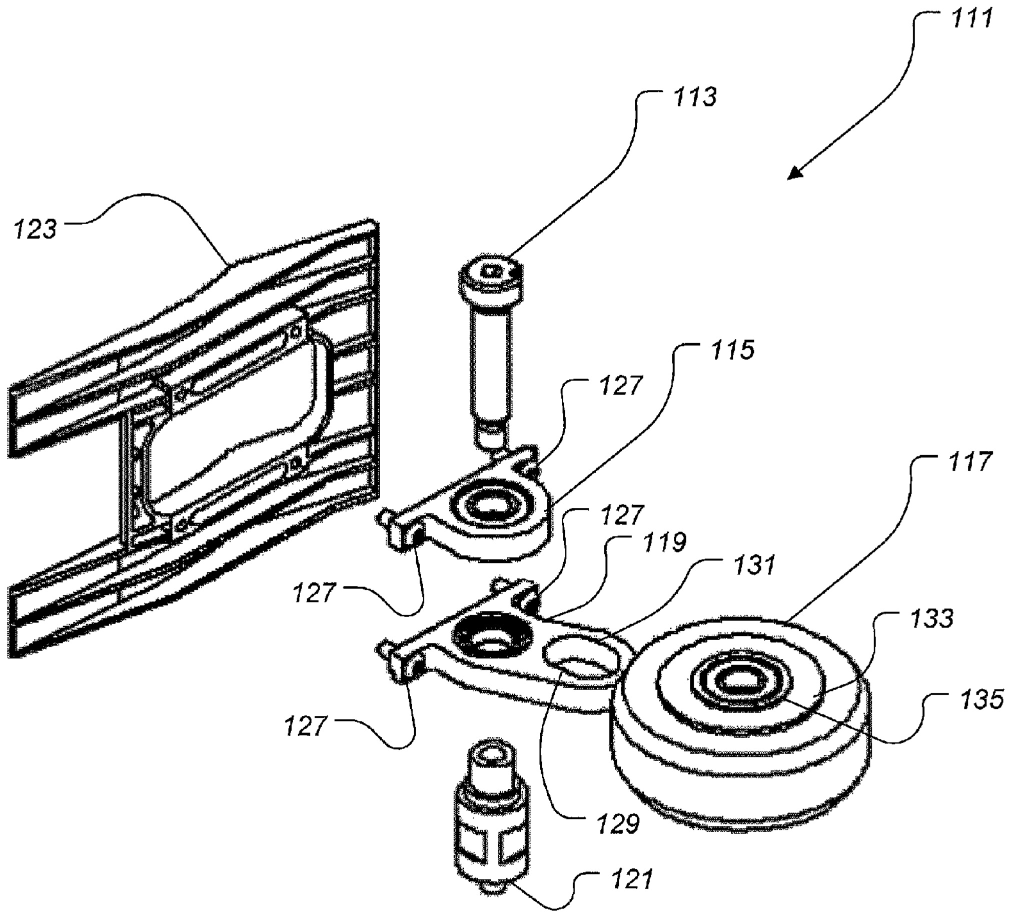
FIG. 3A is an isometric, exploded view illustrating the Diverter Gate with Locking Cam Subassembly, constructed in accordance with the present application.
Figure 3B:
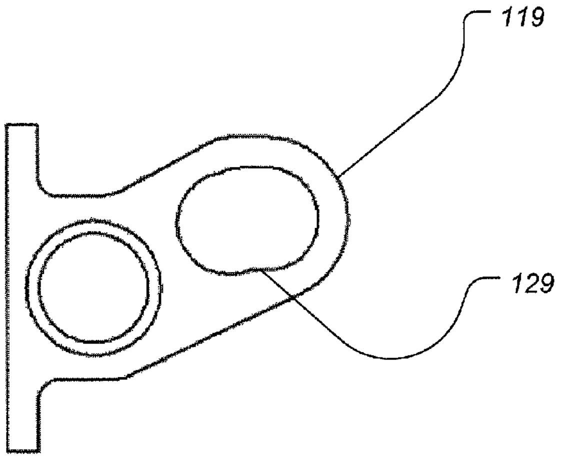
FIG. 3B is a side view illustrating the lower diverter bearing mount, constructed in accordance with the present application.

Referring now to FIG. 3A, the preferred embodiment of a Diverter Gate with Locking Cam Subassembly 111, and to 3B the preferred embodiment of a lower diverter bearing mount 119, are illustrated according to the present application. Diverter Gate with Locking Cam Subassembly 111 is formed when a mounting fastener or robust shoulder bolt 113 passes through the upper diverter bearing mount 115, optional pressure roller 117, and lower diverter bearing mount 119 and is screwed into the top of the retaining member or diverter shaft 121. The present device includes a diverter gate 123 preferably constructed from a plastic material, although constructing the diverter gate 123 from other materials including, but not limited to metal or ceramic is within the scope of the present device. The diverter gate 123 is uniquely formed and shaped to allow articles striking it to smoothly divert with minimum frictional resistance and with optimal flow. The upper diverter bearing mount 115 features a bearing assembly 125 that facilitates its rotation on the shoulder bolt 113. In the preferred embodiment the axis of rotation about the shoulder bolt 113 is located near the center of the diverter gate 123. The diverter gate 123 is securely attached to the upper diverter bearing mount 115 by two screws 127. The lower diverter bearing mount 119 features a bearing assembly to facilitate its rotation on the robust shoulder bolt 113. The diverter gate 123 is securely attached to the lower diverter bearing mount 119 by two screws 127. The lower diverter bearing mount 119 can be produced having locking cam guide slots of varying widths that uniquely define and limit the movement possible to fully actuate the diverter gate 123. The locking cam guide slot 131 may be kidney shaped. The unique notch 129 in the locking cam guide slot 131 of the lower diverter bearing mount 119 greatly increases the amount of impact force that the Diverter Gate with Locking Cam Subassembly 111 can absorb when struck by larger articles and/or articles traveling at higher transport speeds. In an alternative embodiment the upper diverter bearing mount 115 would have a slot to match the lower diverter bearing mount 119 thereby spreading the forces between two slots.

The Diverter Gate with Locking Cam Subassembly 111 may feature an optional pressure roller 117 preferably constructed from a polyurethane material, although constructing the pressure roller 117 from other materials is within the scope of the present application. The optional pressure roller 117 features a hub 133 with an internal bearing 135 assembly to facilitate rotation of the pressure roller 117 on the shoulder bolt 113. The optional pressure roller 117 is positioned on the sorter base plate opposite from a drive roller (not shown). Working together, these rollers ensure that the article traveling through the sorter travel path has the momentum required to continue downstream or divert fully into a receiving compartment or bin.

Figure 4:
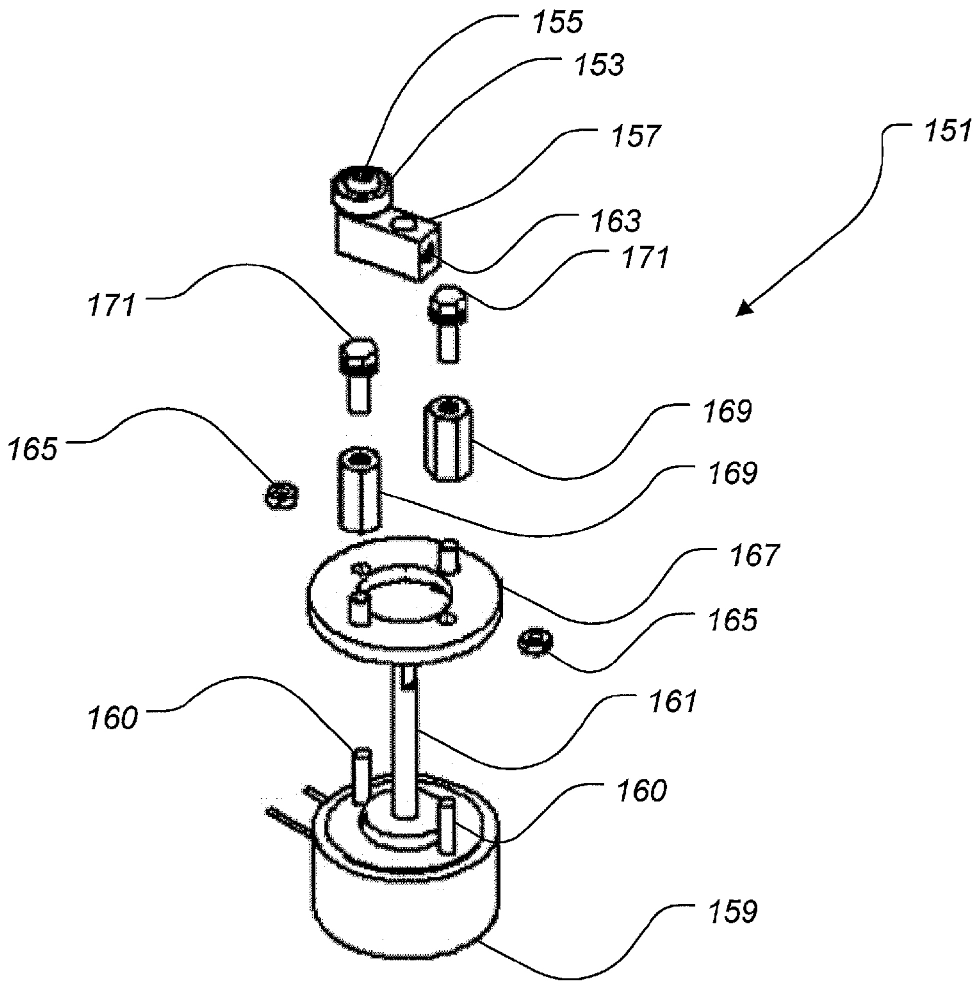
FIG. 4 is an isometric, exploded view illustrating the Solenoid with Cam Bearing Subassembly, constructed in accordance with the present application.

Referring now also to FIG. 4 in the drawings, the preferred embodiment of a Solenoid with Cam Bearing Subassembly 151 according to the present application is illustrated. Solenoid with Cam Bearing Subassembly 151 is formed when a cam bearing 153 is securely mounted with a screw 155 to a mounting arm 157. The cam bearing 153 and mounting arm 157 are sized and constructed to withstand the impact of larger articles and of articles traveling at high transport speeds striking the diverter gate 123. When the control electronics energizes the solenoid 159, the solenoid shaft 161 rotates to move mounting arm 157, which move the cam bearing 153 into the notch 129 in the locking cam guide slot 131 of the lower diverter bearing mount 119 of the Diverter Gate with Locking Cam Subassembly 111. The mounting arm 157 is firmly secured with a setscrew 163 to the solenoid shaft 161 of the solenoid 159.

The present device includes a solenoid 159 sufficiently rated, sized, and constructed to efficiently actuate the cam bearing 153 traveling in the lower diverter bearing mount 119. Solenoid 159 selection may require different control electronics and/or control voltages available on different and specific sorter configurations. Solenoid 159 selection may require clockwise or counterclockwise activation depending upon the requirements of different and specific sorter configurations. Solenoid 159 selection may require energizing voltages for both activation and deactivation depending upon the requirements of different and specific sorter configurations. The solenoid 159 is firmly attached by securing two nuts 165 to threaded rods 160 thereby securing solenoid 159 to a solenoid mount 167. The solenoid mount 167 is firmly attached to two threaded spacers 169, two bolts 171 secure the threaded spacers 169 to the sorter base plate.

Figure 5:
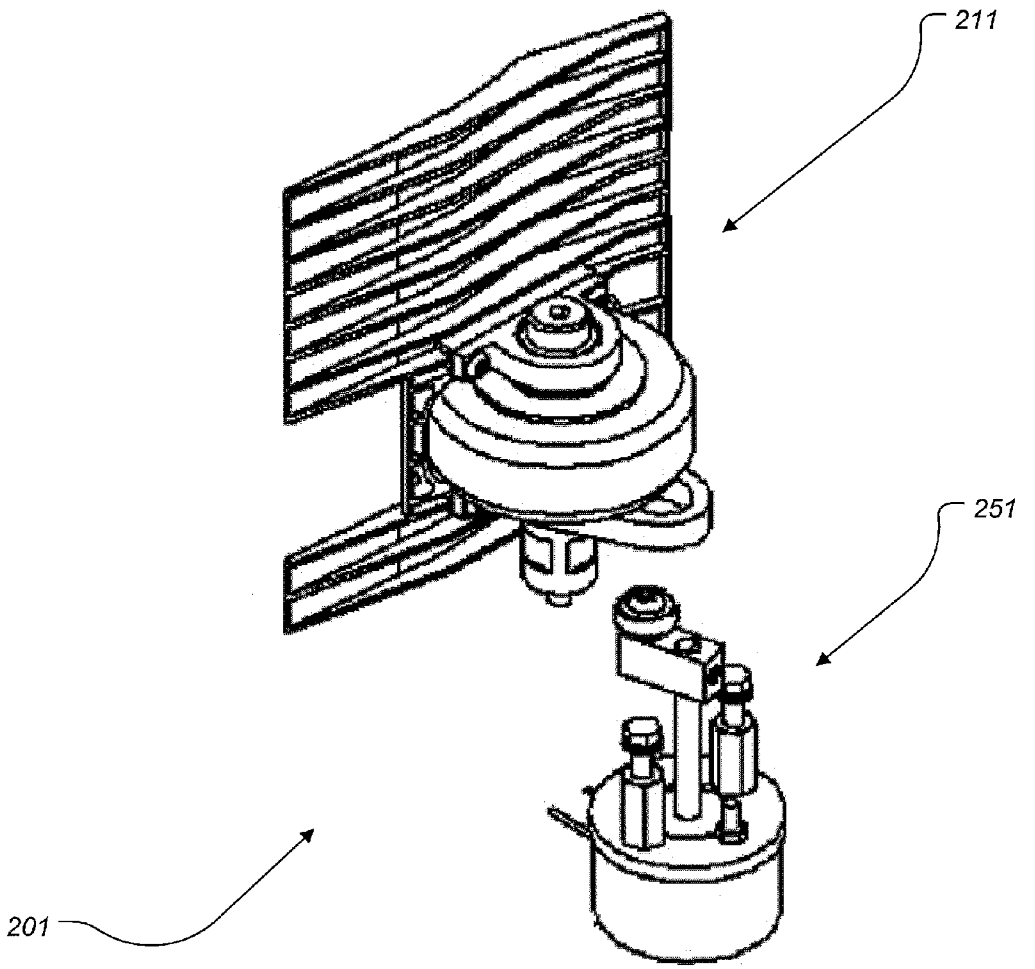
FIG. 5 is a perspective view of the preferred embodiment of a Diverter Gate with Locking Cam Subassembly and a Solenoid with Cam Bearing Subassembly for flats mail and like items according to the present application.

Referring now also to FIG. 5 in the drawings, the preferred embodiment of a Locking Cam Diverter Gate Assembly 201 for diverting articles such as flats mail, and/or parcels to a destination compartment or bin according to the present application is illustrated. Each Locking Cam Diverter Gate Assembly 201 is uniquely implemented in two interlocking subassemblies; the Diverter Gate with Locking Cam Subassembly 211 and the Solenoid with Cam Bearing Subassembly 251.

Figure 6:
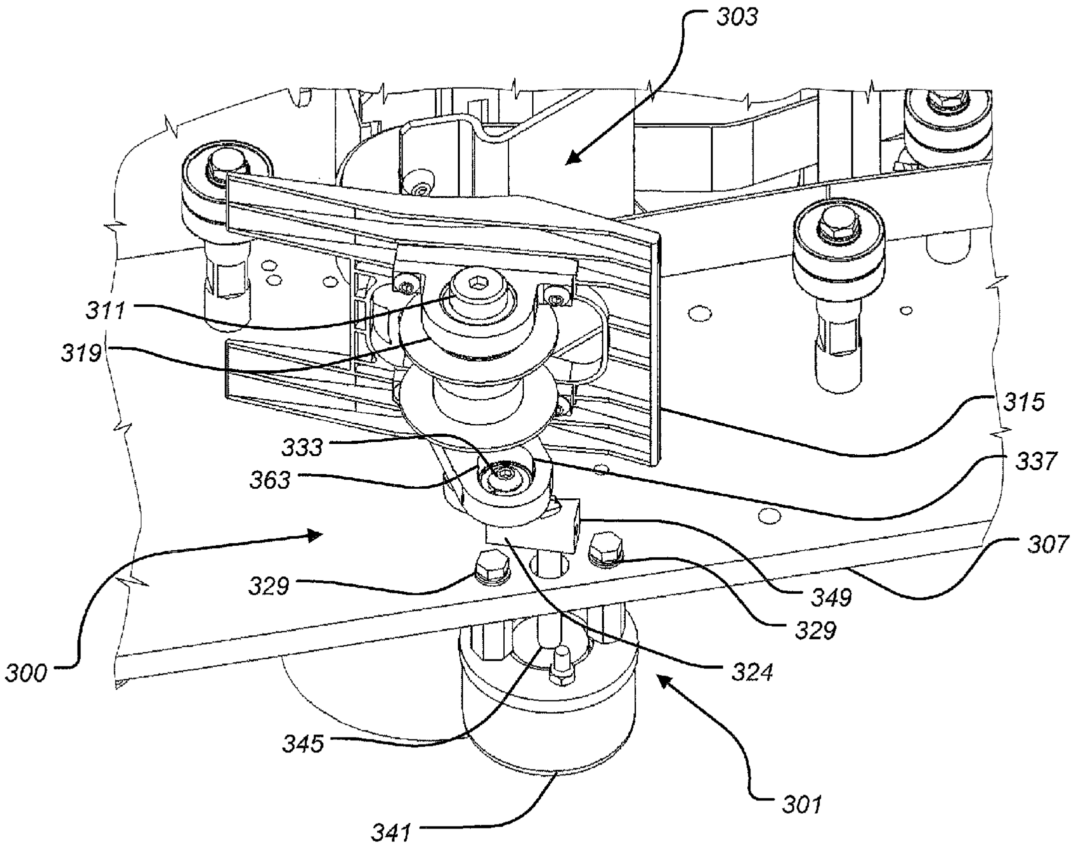
FIG. 6 is a perspective view of a Locking Cam Diverter Gate Assembly according to the present application.

Referring now also to FIG. 6 in the drawings, a preferred embodiment of a Locking Cam Diverter Gate Assembly 300 according to the present application is illustrated. Diverter Gate with Locking Cam Subassembly 303 is firmly mounted to the sorter base plate 307 by a shoulder bolt 311 and nut (not shown) beneath the sorter base plate 307. The diverter gate 315 rotates around the shoulder bolt 311, which is capable of withstanding the impact of larger articles and/or of articles traveling at higher transport speeds. Further, the diverter gate 315 is firmly supported by an upper diverter bearing mount 319 and a lower diverter bearing mount 324 that together are uniquely capable of withstanding the impact of larger articles and/or of articles traveling at higher transport speeds.

The Solenoid with Cam Bearing Subassembly 301 is separately and firmly mounted by bolts 329 to the sorter base plate 307. The cam bearing 333 fits into the unique locking cam guide slot 337 of the lower diverter bearing mount 324. When the control electronics sends an energizing voltage to the solenoid 341, the solenoid shaft 345 rotates to move an articulating mounting arm 349 with the attached cam bearing 333. The cam bearing 333 moves through the locking cam guide slot 337 in the lower diverter bearing mount 324 from the home position to the actuated position, where the cam bearing 333 settles in a notch 363 in the lower diverter bearing mount 324. The notch 363 in the locking cam guide slot 337 of the lower diverter bearing mount 324 greatly increases the amount of impact force that the Diverter Gate with Locking Cam Subassembly 303 can absorb when struck by larger articles and/or articles traveling at higher transport speeds. As the cam bearing 333 moves through the locking cam guide slot 337 in the lower diverter bearing mount 324, the diverter gate 315 also moves from the home or unblocked position to the actuated or blocked position. By using different lower diverter bearing mounts 324 with varying locking cam guide slot 337 widths, the present device uniquely defines the total degree of movement possible to fully actuate the diverter gate 315 to widths required by different and specific sorter configurations. Additionally, since the diverter gate 315 is not mounted directly on the solenoid shaft 345, the impact of larger articles and/or articles traveling at higher transport speeds are isolated from and therefore cannot overdrive the diverter gate 315 and/or solenoid 345.

By using two subassemblies, the present device uniquely isolates the impact and provides a fixed stop limit against larger articles and/or articles traveling at higher transport speeds striking the diverter gate 315 to the limits of the locking cam guide slot 337 in the lower diverter bearing mount 324.

Figure 7A:
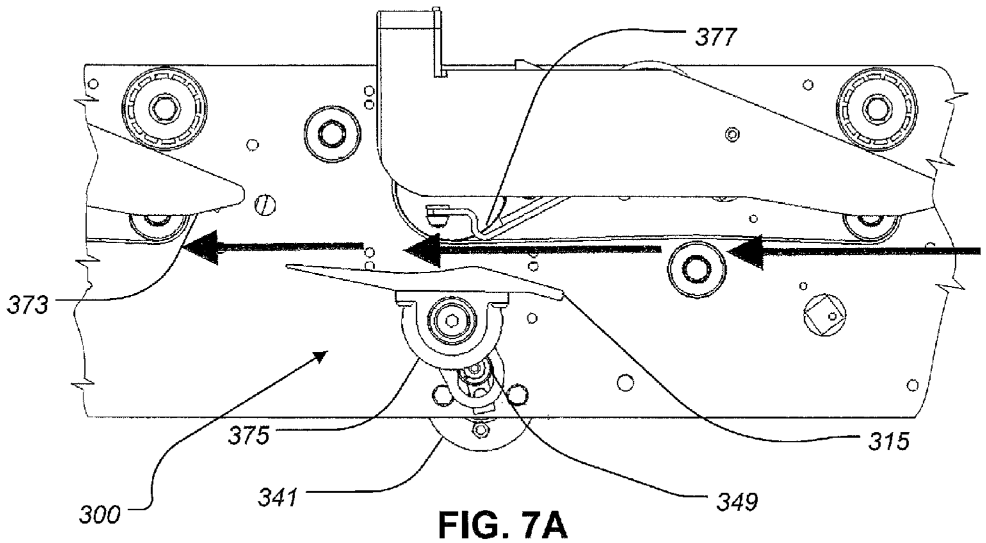
FIG. 7A is a top view depicting the installed relationship of the present device relative to the travel path as viewed from above in a non-diverted mode according to the present application.
Figure 7B:
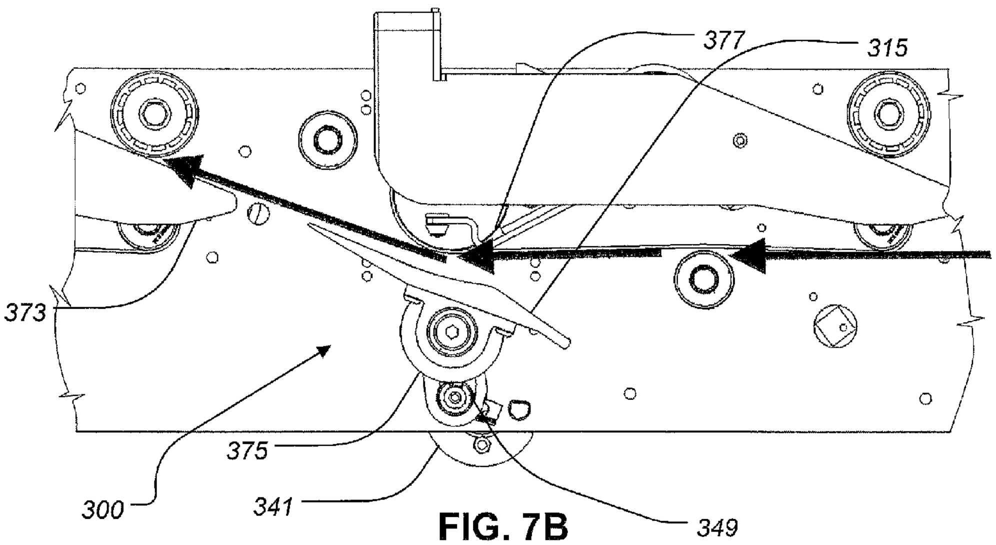
FIG. 7B is a top view depicting the installed relationship of the present device relative to the travel path as viewed from above in a diverted mode according to the present application.

Referring now to FIG. 7A, the preferred embodiment of a Locking Cam Diverter Gate Assembly 300 with an unblocked transport path, and to 7B the preferred embodiment of a Locking Cam Diverter Gate Assembly 300 with a blocked transport path, are illustrated according to the present application. With the diverter gate 315 blocking the transport path, the article is sorted to the destination compartment or bin 373 as illustrated in FIG. 7B.

The control electronics sustains the energizing voltage to the solenoid 341 until the appropriate, configurable diverter delay parameter times out. When the control electronics diverter delay parameter times out, the solenoid energizing voltage is disabled and the solenoid 341 de-energizes. The solenoid shaft 345 rotates to move the bearing block 349 with attached cam bearing 333. As the cam bearing 333 moves through the locking cam guide slot 337 in the lower diverter bearing mount 331 from the actuated position as illustrated in FIG. 7A to the home position as illustrated in FIG. 7B, the diverter gate 315 also moves from the actuated position as illustrated in FIG. 7A to the home position as illustrated in FIG. 7B.

When the control electronics sends an energizing voltage to the solenoid 341, the bearing assembly 349 travels through the locking cam guide slot 337 in the lower diverter bearing mount 324 until it settles in the notch 363. As the bearing assembly 333 moves, the diverter gate 315 moves from the home position as illustrated in FIG. 7A to the actuated position as illustrated in FIG. 7B thereby blocking the travel path and diverting the article to a receiving compartment or bin 373.

When the control electronics diverter delay parameter times out, the solenoid energizing voltage is disabled and the solenoid 341 de-energizes. Then the bearing assembly 349 travels through the locking cam guide slot 337 in the lower diverter bearing mount 324 until it returns to the home position as illustrated in FIG. 7A. As the bearing assembly 349 moves, the diverter gate 315 moves from the actuated position as illustrated in FIG. 7B to the home position as illustrated in FIG. 7A.

Figure 8:
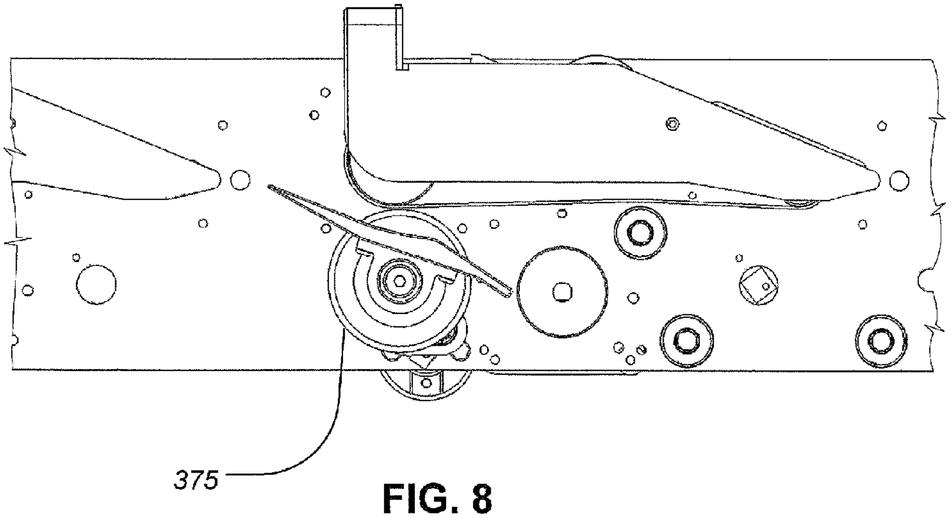
FIG. 8 is a top view of the Locking Cam Diverter Gate Assembly in an actuated position according to the present application.
Figure 9:
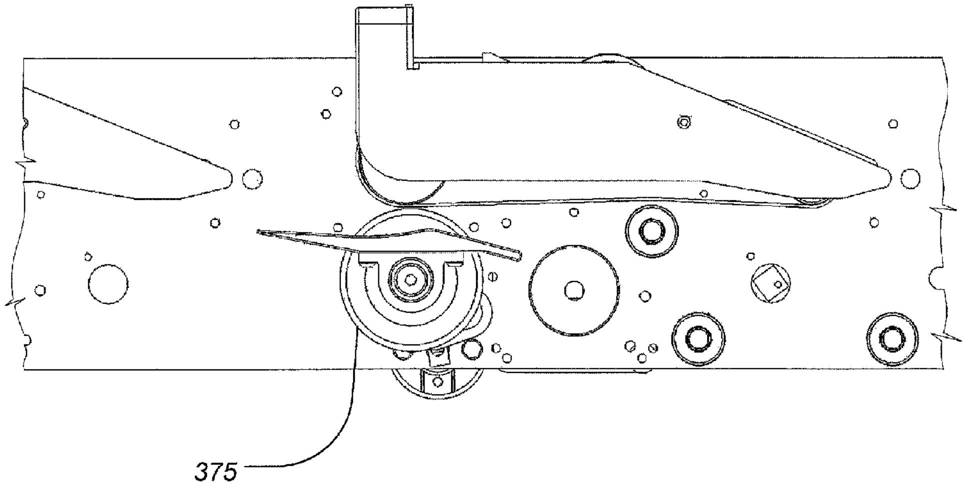
FIG. 9 is a top view of the Locking Cam Diverter Gate Assembly in a normal position according to the present application.

The Locking Cam Diverter Gate Assembly 300 may include an optional pressure roller 375 positioned opposite from a drive roller 377 that working together, ensure that sorted articles have the momentum required to continue downstream as illustrated in FIG. 7A or divert fully into a receiving compartment or bin 373 as illustrated in FIG. 7B. Optional pressure roller 375 may be different diameters depended upon the type of articles fed by the downstream diverter as shown in FIGS. 8 and 9.

Figure 10:
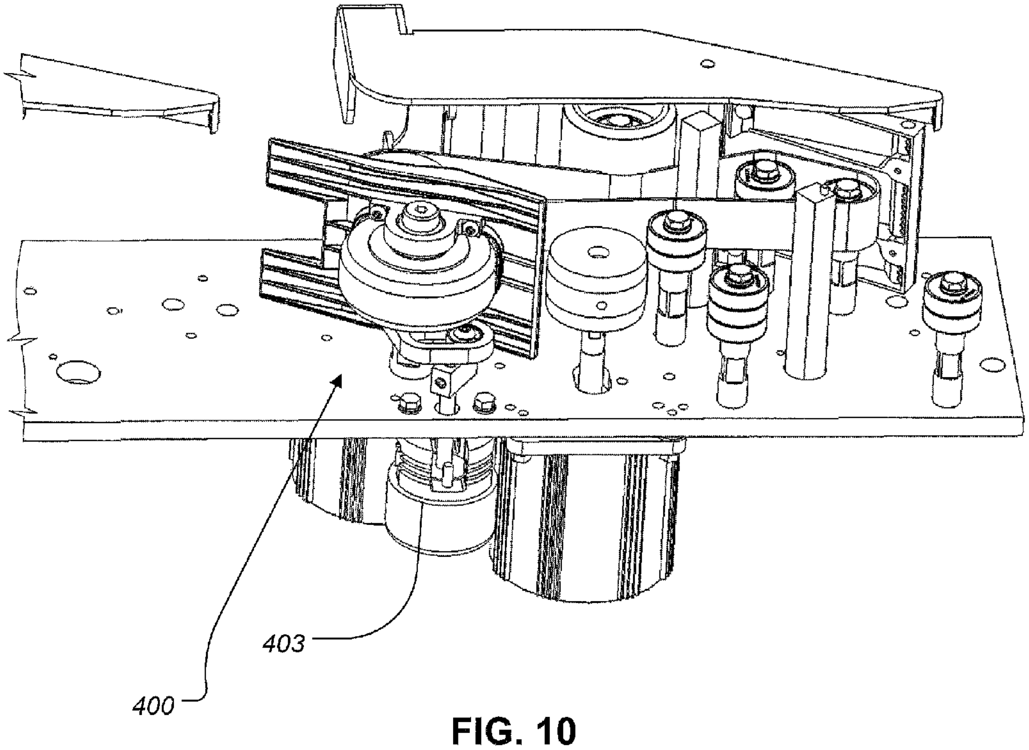
FIG. 10 is a perspective view of the Locking Cam Diverter Gate Assembly in a actuated position according to the present application.
Figure 11:
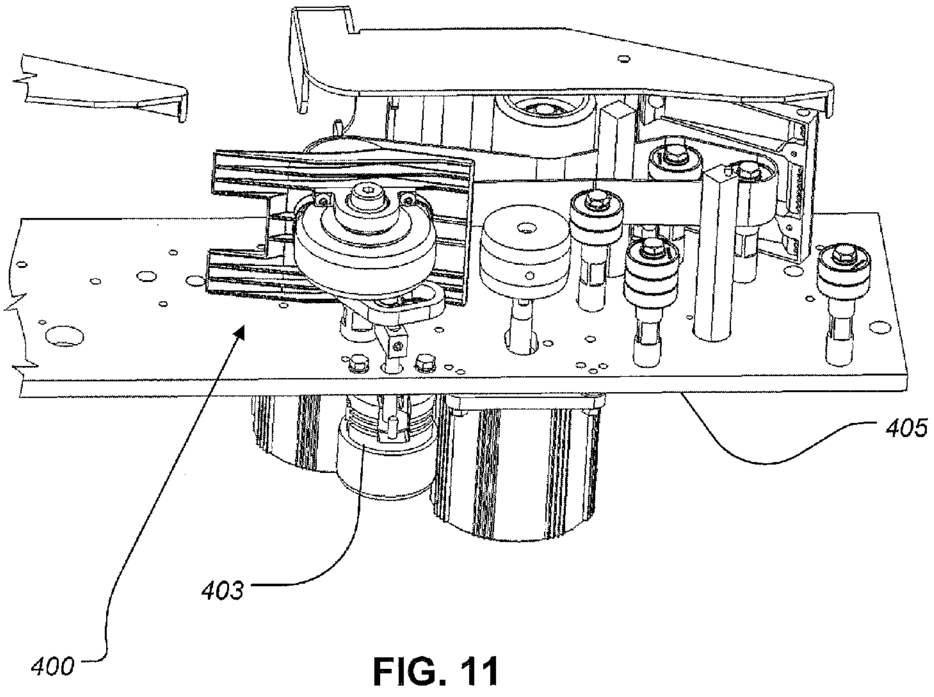
FIG. 11 is a perspective view of the Locking Cam Diverter Gate Assembly in a normal position according to the present application.

Referring now to FIG. 10, the alternative embodiment of a Locking Cam Diverter Gate Assembly 400 with an blocked transport path, and to FIG. 11 the alternative embodiment of a Locking Cam Diverter Gate Assembly 400 with an unblocked transport path, are illustrated according to the present application. A heat sink 403 may be used to attach solenoid to the sorter base plate 405.

What is claimed is:

1. A downstream diverter for a machine for sorting articles, the downstream diverter comprising:
- a diverter gate;
- a retaining member;
- a mounting fastener;
- a first diverter gate mount;
- a second diverter gate mount with a slot; and
- a solenoid with cam bearing subassembly, the solenoid with cam bearing subassembly comprising:
  - a solenoid;
  - a mounting arm; and
  - a cam;
- wherein the second diverter gate mount, the slot, the mounting arm, the cam, and the solenoid are configured such that forces resulting from the articles colliding with the diverter gate are isolated from the solenoid and do not allow colliding articles to move the diverter gate.

2. The downstream diverter according to claim 1, wherein the slot comprises:
- a notch.

3. The downstream diverter according to claim 1, wherein the first diverter gate mounts comprises:
- a slot.

4. The downstream diverter according to claim 1, further comprising:
- a roller carried by the first diverter gate mount and the second diverter gate mount.

5. The downstream diverter according to claim 4, wherein the roller is disposed between the first diverter gate mount and the second diverter gate mount.

6. The downstream diverter according to claim 1, wherein the solenoid with cam bearing subassembly further comprises:

a heat sink.

7. A downstream diverter for a machine for diverting articles to a destination compartment comprising:

a diverter gate, wherein the diverter gate rotates about an axis disposed near the center of the diverter gate;

a retaining member;

a mounting fastener;

a first diverter gate mount;

a second diverter gate mount; and wherein at least one of the diverter gate mounts comprises:

a slot, having a notch; and a solenoid with cam bearing subassembly, the solenoid with cam bearing subassembly comprising:

a solenoid;

a mounting arm, wherein the mounting arm is capable of rotating by the solenoid; and a cam;

wherein the first diverter gate mount, the second diverter gate mount, the slot, the notch, the mounting arm, the cam, and the solenoid are configured such that forces resulting from the articles colliding with the diverter gate are isolated from the solenoid.

8. The downstream diverter according to claim 7, wherein the notch is sized to limit travel of the cam between a home position and an actuated position.

9. The downstream diverter according to claim 7, wherein both diverter gate mounts comprises:

a slot.

10. The downstream diverter according to claim 7, further comprising:

a pressure roller.

11. The downstream diverter according to claim 10, wherein the pressure roller is disposed between the first diverter gate mount and the second diverter gate mount.

12. The downstream diverter according to claim 7, wherein the solenoid with cam bearing subassembly further comprises:

a heat sink mount for securing the solenoid.

13. The downstream diverter according to claim 12, wherein the solenoid with cam bearing subassembly further comprises:

a heat sink.

14. A downstream diverter for a machine for diverting articles comprising:

a diverter gate;

a retaining member;

a mounting fastener;

a first diverter gate mount;

a second diverter gate mount with a kidney shaped slot; and a solenoid with cam bearing subassembly, the solenoid with cam bearing subassembly comprising:

a solenoid;

a mounting arm, wherein the mounting arm is capable of rotating by the solenoid; and a cam;

wherein the diverter gate, the first diverter gate mount, and the second diverter gate mount are configured such that an axis of rotation about the mounting fastener is disposed near the middle of the diverter gate; and wherein the diverter gate, the first diverter gate mount, the second diverter gate mount, the kidney shaped slot, the mounting arm, the cam, and the solenoid are configured such the diverter gate rests in a blocked position or in a unblocked position and that forces resulting from the articles colliding with the diverter gate while in the blocked position are isolated from the solenoid.

15. The downstream diverter according to claim 14, further comprising:

a roller carried by the first diverter gate mount and the second diverter gate mount.

16. The downstream diverter according to claim 15, wherein the roller is disposed between the first diverter gate mount and the second diverter gate mount.

* * * * *